INVENTOR.
OLIVO GIUSEPPE SIVILOTTI
PERVI CARLSSON

INVENTOR.
Olivo Giueseppe Sivilotti
Pervi Carlsson
BY
Bailey, Stephens & Huettig
ATTORNEYS

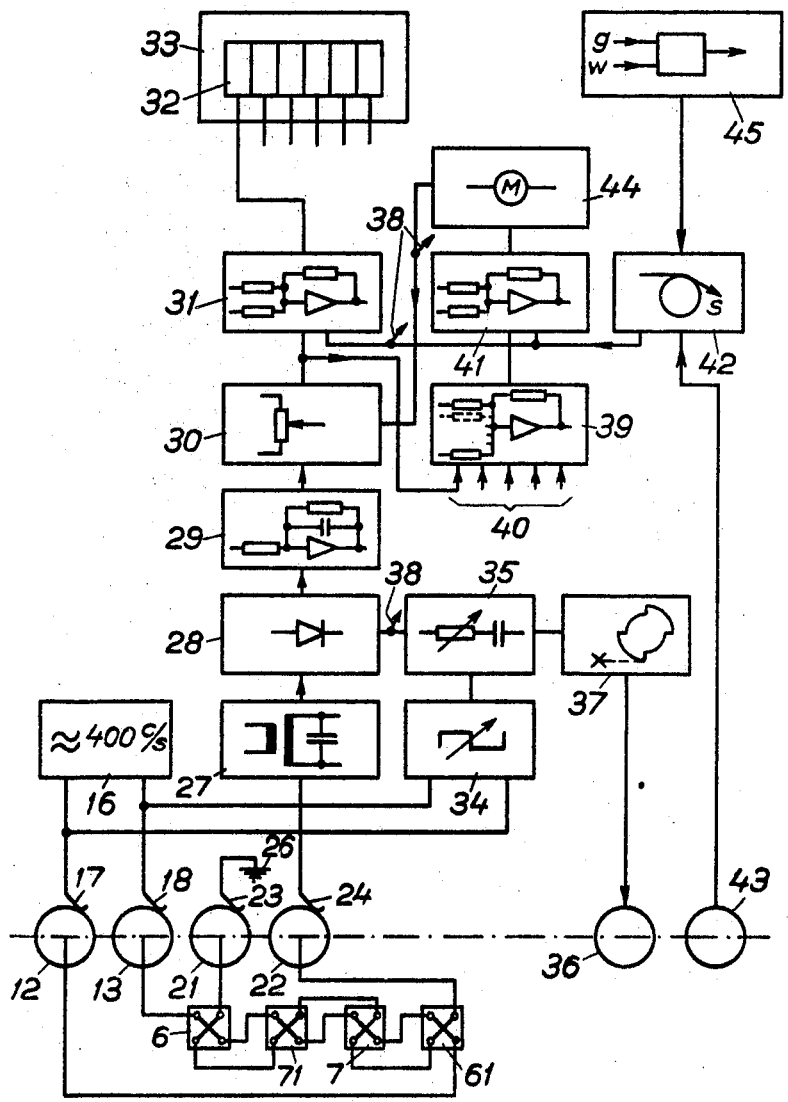

United States Patent Office 3,481,194
Patented Dec. 2, 1969

3,481,194
STRIP FLATNESS SENSOR
Olivo Giuseppe Sivilotti, Kingston, Ontario, Canada, and Pervi Carlsson, Västeris, Sweden, assignors to Allmänna Svenska Elektriska Aktiebolaget, Vasteras, Sweden, a Swedish corporation
Filed Oct. 5, 1966, Ser. No. 584,473
Claims priority, application Sweden, Oct. 5, 1965, 12,862/65; June 20, 1966, 8,351/66
Int. Cl. G01l 5/12, 5/04
U.S. Cl. 73—144                                19 Claims

ABSTRACT OF THE DISCLOSURE

In a strip mill, the distribution of tension across the strip as it passes over a billy roll is measured by means of transducers located close to the roll surface and spaced along it; there preferably being at least two transducers in each section angularly spaced around the roll axis.

---

Figure 1A:
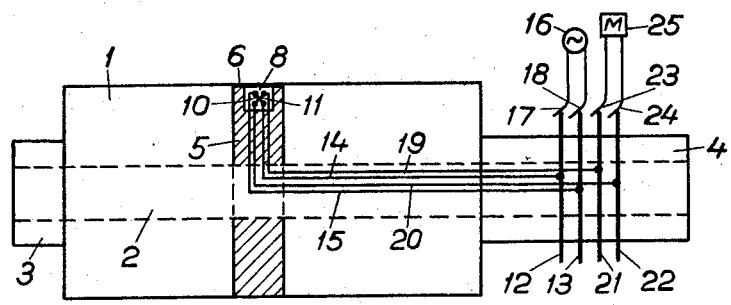

In order to measure the tension with which the coiler acts upon a strip-like material when it leaves the work rolls in a rolling mill, usually a tension sensing device is used in which the strip is bent at a known angle across a billyroll whose bearing rests on power measuring devices. By keeping the wrapping angle constant, the output from the measuring device gives information about the strip tension. The device does not however give any information on the distribution of the strip tension transverse to the rolling direction, but only measures its total value. Because of the non-uniform goods, or because the rolls are uneven or because of the uneven temperature distribution or other circumstances, the gauge reduction may be non-uniform and thus the lengthening of the strip will vary across the strip. This means that the rolled material does not remain flat when the strip tension ceases. As long as the rolled goods are subjected to the strip tension during winding and rewinding on the coiler, they remain flat and local variations in the lengthening of the strip are not visible before the strip tension ceases, and thus during the winding it is not possible to control the causes of the off-flatness. If it were possible to continually measure the distribution of the strip tension transverse to the rolling direction during winding, it would be possible in most cases to remove the causes of the off-flatness, for example by locally cooling the rollers or by other measures.

The present invention relates to a means for use in strip mills for measuring the distribution of the strip tension across the strip by selective indication of the strip pressure against the surface of a billy roll arranged in the strip mill. The indication of the pressure is carried out by pressure-sensitive transducers which are arranged close to the surface of the billy roll and which are of the type which produces an electric output signal dependent on the pressure with which the strip acts on the transducer. The measuring means also comprises means to pick up said output signal from the billy roll and transmit it to a measuring or registering device. The invention is characterised in that the billy roll is divided into a number of axially situated sections, each comprising at least one pressure-sensitive zone and that each of said zones is provided with at least one pressure-sensitive transducer.

With a means according to the invention, for each turn which the billy roll rotates there will be the same number of measuring values of the pressure of the strip against the billy roll as the number of pressure sensitive zones in the different sections. Since said pressure is dependent on the local strip tension, it can be determined how this varies across the strip from the measuring signal produced. If two pressure sensitive zones are situated diametrically opposite and the measuring windings in the transducers in said two zones arranged in the said way are series-connected, any faulty signals which occur with different signs on two diametrically opposite sides of the billy roll will to a great extent eliminate each other. Other faulty signals which are symmetrical with respect to the axis of revolution of the roll, such as those created by centrifugal forces and thermal stresses, are also eliminated by series opposed connection of the other pair of sensitive zones.

Figure 4:
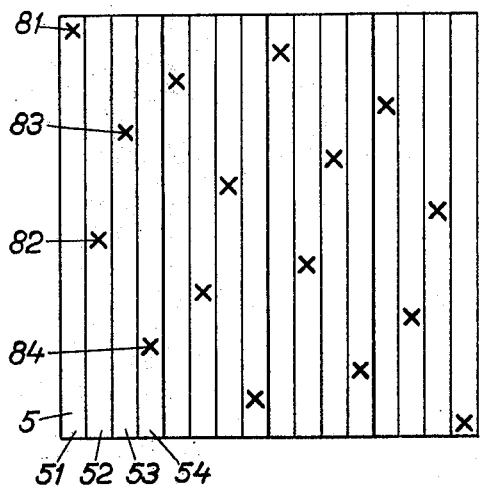
Figure 1B:
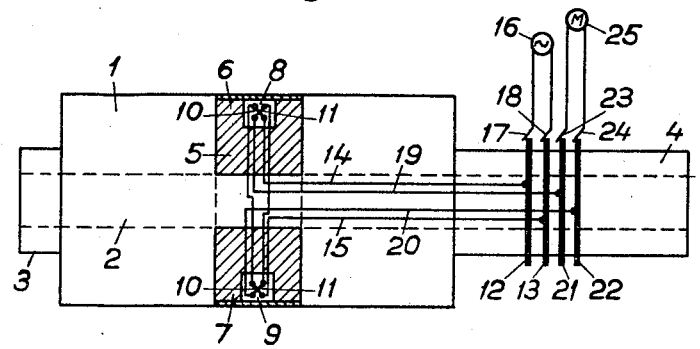

The invention will be described with reference to the accompanying drawing where FIGURES 1a and 1b shows a section through a billy roll with one and two, respectively, pressure-sensitive zones per section. FIGURES 2a–2d show how the pressure-sensitive zones may be arranged within a section. FIGURE 3 shows an example of how the windings in the transducers are connected together to compensate disturbance signals. FIGURE 4 shows the spread-out sheath surface of a billy roll with one pressure-sensitive zone per section. FIGURE 5 finally shows in the form of a block diagram an example of how the equipment necessary for the treatment of a measuring signal can be made.

The billy roll 1 shown in FIGURE 1a has a central, through-running channel 2. The roll is provided at its ends with terminals 3 and 4. The billy roll is divided into a number of axially spaced sections, only one, 5, of which is shown in the figure, in section in a diametrical plane. This diametrical plane has a single pressure-sensitive zone 6. The pressure-sensitive zones are situated at the surface of the roll and are provided with at least one pressure-sensing transducer each. The transducers consist of a core of magneto-strictive material which has an excitation winding 10 and a measuring winding 11. The excitation winding is connected to two slip rings 12 and 13 by means of conductors 14 and 15 and an excitation current source 16 is connected to the slip rings by means of brushes 17 and 18. The excitation winding 11 is in the same way connected to two slip rings 21 and 22 by means of conductors 19 and 20 and a measuring or registering device 25 is connected to the slip rings by brushes 23 and 24.

The transducers may be of the type having a core of laminated plate provided with four through-running holes in which exitation and measuring windings are inserted. The two windings are so arranged that they cross each other outside the end surfaces of the transducers. To obtain a transducer of less thickness, which is certain cases may be suitable, the transducer may be made as a rectangular plate which, if imagined as placed in a horizontal plane, has a height of 1–2 cm. A number of parallel, horizontal channels are situated in the plate, preferably evenly distributed in a horizontal plane through the plate. In these channels are arranged both excitation and measuring windings parallel to each other. Such a transducer will operate as an inductance reactance where the inductance is dependent on the pressure influencing the transducer.

FIGURE 1b shows a diametrical section through a billy roll where each section contains two diametrically, oppositely situated pressure-sensitive zones. Besides the pressure-sensitive zone 6 with transistor 8 shown in FIGURE 1, the billy roll according to FIGURE 1b also contains a pressure-sensitive zone 7 situated directly opposite, with a transducer 9.

In order to obtain a selective sensing of the pressure of the strip against the billy roll, this comprises a number of sections lying close to each other. The number of sections depends on the length of the billy roll and on the accuracy with which the measuring is to be carried out. As approximate values of the width of a section, 5–10 cm., can be given, but this must not be taken as a definite limitation. Under the same presumption the number of sections can be in the order of 25.

The exciting windings in all the transducers in the billy roll are suitably series-connected and connected to slip rings 12 and 13. If it is thought to be suitable, the windings can however be connected in parallel or in another way, for example parallel connection of a number of series-connected windings.

If each section contains only one pressure-sensitive zone, no compensation can be obtained for error or disturbance signals within the section, but by connecting together the transducers in a suitable number of sections in a suitable manner, this can be achieved. FIGURE 4 shows the spread-out cylinder surface of a billy roll having 16 sections each containing a single pressure sensitive zone. To obtain the previously mentioned compensation of error signals the four sections situated further to the left, 51, 52, 53 and 54 have been combined to a group and the transducers, marked with a cross, of the pressure-sensitive zones situated therein have been series-connected so that the error signals cancel each other. The series-connection of the measuring windings in the four zones is connected to two slip rings. Similarly the other zones are combined to groups of four zones each and each group connected to slip rings. The number of slip rings can be decreased by connecting one end of each series-connection to a slip ring common to all groups. The measuring windings of each group are thus connected partly to a common slip ring and partly to a slip ring individual for each group. Since all the excitation windings are series-connected and thus require two slip rings the total number of slip rings in the shown example will be only 7.

Figure 2A:
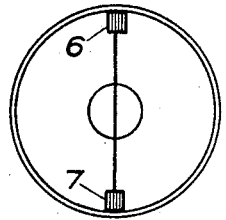
Figure 2B:
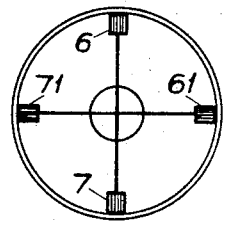
Figure 2C:
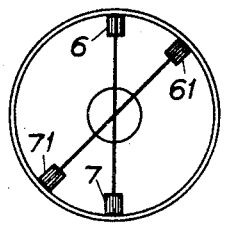
Figure 2D:
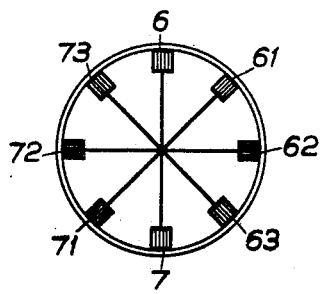
Figure 3:
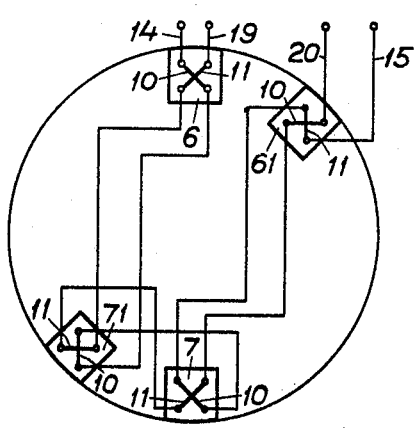

If each section comprises two pressure-sensitive zones they are arranged as shown in FIG. 2a, i.e. the zones 6 and 7 are arranged diametrically opposite. FIGS. 2b and 2c show the arrangement of four zones 6, 7, 61 and 71. The planes in which the zones are arranged in pairs may lie at right angles to each other or form an angle which is less than 90° with each other. The angle between the planes must however be large enough so the strip cannot act at the same time on the transducers in two planes lying close to each other, so that among other things the wrapping angle and the peripheral extension of the pressure-sensitive zones will influence the size of said angle. According to FIG. 2d each section comprises eight pressure-sensitive zones 6, 7, 61, 71, 62, 72, 63, and 73 arranged in four planes with even mutual distribution. The pressure-sensitive zones 6 and 7 as well as 61 and 71 can then be used for measuring, such as shown in FIG. 2c, while the remaining zones are in reserve.

FIG. 3 shows in more detail how exciting and measuring windings are connected together when the transducers are arranged in two planes, such as shown in FIG. 2c. The measuring windings 11 in the zones 61 and 71 are connected so that the signals induced therein are counter-directed to the signals which are induced in the zones 6 and 7. Signals of error or disturbances which depend for example on bending stresses in the roll or the weight of the roll occur with reversed signs at two diametrically oppositely situated points, so that such signals are to a great extent eliminated if the signals from the measuring windings in two diametrically situated zones are added. Measuring faults which depend on centrifugal forces and temperature variations in the billy roll occur with the same sign everywhere in the roll and such faults are eliminated by each half of the windings being connected in opposite directions. With four pressure-sensitive zones in each section, compensation for faulty signals is thus obtained, which signals depend on deflecting as well as temperature variations.

The measuring equipment denoted by 25 in FIGURES 1a and 1b can be made in many different ways and FIG. 5 shows in block form an example of how such measuring equipment can be manufactured.

The slip ring 21 and the brush 23 co-operating with it serve as a common return conductor for the transducers in all sections and it is therefore shown earthed at 26. A number of devices are connected to the slip ring 22 through brush 24 from which the signal from a certain section 5 of the billy roll is taken out. Next to the brush there is a tracking impedance and filter device 27 and then follows a phase-sensitive rectifier 28, an amplifier with filter 29, a sensitivity regulator 30, a difference producer 31 and finally an indicator element 32 in an indicator 33 common to the complete measuring equipment. For each section of the billy roll it is thus necessary to have a slip ring with a brush and a chain of the devices now mentioned. A phase tuning and squaring device 34 is connected to the exciting source 16, and effects suitable phase displacement of the signal and converts the sine-shaped exciting signal to a rectangular signal. The output from the device 34 is supplied to a phase inverter 35. The billy roll is also provided with a pulse transducer 35 whose output is supplied to a flip-flop connection 36 which in its turn guides the phase inverter 35 whose output provides control voltage for the phase-sensitive rectifier 28. By phase inversion of the control voltage a polarity reversal of the output of the phase-sensitive rectifier is effected. The polarity reversals occur at equal intervals and are synchronised with the rotation of the roll so that all signal pulses have the same polarity, while disturbance signals and zero signals are smothered. The signal from the phase inverter 35 is supplied to all the phase sensitive rectifiers in the measuring equipment, which is marked by the arrow 38. This mark also appears in other places in the figure. The output from the phase-sensitive rectifier is amplified and is filtered in the device 29 and the signal is then supplied to the sensitivity regulator 30.

An average value transducer 39 is supplied through a number of leads 40 of the outputs from the sensitivity regulators belonging to various numbers of sections of the billy roll so that the output from the transducer 39 can be said to represent the average value of the specific strip tension, that is of the tensile stress applied to the strip as measured by the transducers on the surface of the billy roll. This output is supplied to a second difference producer 41, to which is also supplied a signal which corresponds to the total specific strip tension, that is of the tensile stress applied to the strip, as measured by a tensiometer. This latter signal is delivered for example from a strip tension measuring device 42, which is arranged to be connected to the bearings of the billy roll, which is denoted by 43. Such strip tension measuring devices are well-known and there is therefore no reason to describe them in more detail here. The output of the strip tension measuring device is calibrated by a strip cross-section switch 45 and therefore provides to a second difference producer 41 an input signal proportional to the tensile stress applied to the strip. The output from the second difference producer 41 is supplied to a servo device 44 which controls all the sensitivity regulators 30 of the measuring equipment in such a way that the signal from the second difference producer 41 is reduced to zero. This means that the signal from the sensitivity regulator 30 becomes standardised to the same scale as the signal for the total strip tension from the strip tension measuring device 42.

The output from the sensitivity regulator 30 is supplied to the first mentioned difference producer 31, which is also supplied with a signal coming from the strip tension measuring device 42 which is taken as a measure of the average value of the true strip tensile stress. The output signal from the difference producer 31 is thus equal to the difference between the local strip tensile stress and the average strip tensile stress and this signal is supplied to the indicator element 32 in the indicator 33 which belongs to the actual section of the billy roll. The different indicator elements 32 in the indicator will thus each indicate the deviation from the average value of the strip tension itself within its own section and a combination of all the indications gives a picture of the distribution of the strip tension across the width of the strip.

The automatic control of the sensitivity in the measuring equipment for local strip tension is necessary, since the force which acts on a pressure sensitive zone in the billy roll is not a direct measurement of the local strip tension. With the exception of the strip tension itself, said force is dependent on the wrapping angle and the strip thickness. The signal from the transducers can also be dependent on temperature and the number of turns.

By multiplying the signal from the strip tension measurer 42 by a factor which is proportional to the inverted value of the cross sectional area of the strip before the signal is supplied to the two difference producers, the indicator elements will show the difference between local stress and average stress in the strip instead of the difference in the strip tension. It is easier for the operator to understand a signal which is standardised in such a way than a signal which is calibrated in respect to the strip tension and said signal is also more suitable as an input to a system for automatic control of devices for locally influencing the reduction.

It is understood that, whenever a number of sections are series-connected into a group, the measuring and registering device is provided by suitable discriminators to separate the output of each section into single channels.

We claim:

1. In a strip mill having a rotatably mounted billy roll over which the strip is deflected at a certain angle while passing over the billy roll, said billy roll being provided with pressure measuring means comprising a plurality of pressure sensitive transducers axially spaced along the surface of the billy roll and arranged in recesses in the billy roll close to said surface, said transducers rotating with the billy roll and each of said transducers periodically producing an electric output signal dependent on the pressure exerted thereon by the strip, an indicator device and means to transmit output signals from the transducers to the indicator device.

2. Means according to claim 1, said billy roll being divided into a plurality of axially situated sections, each of said sections comprising at least one pressure-sensitive zone, each of said pressure-sensitive zones being provided with at least one pressure sensitive transducer.

3. Means according to claim 2, each of said sections comprising four pressure-sensitive zones arranged in two diametrical planes, said two planes being perpendicular to each other.

4. Means according to claim 2, each of said sections comprising four pressure-sensitive zones arranged in two diametrical planes, the angle between said planes being less than 90°.

5. Means according to claim 2, each of said sections comprising eight pressure-sensitive zones evenly distributed into four diametrical planes, the angle between said planes being 45°.

6. Means according to claim 2, the transducers in one section being series-connected with the transducers situated diametrically opposite in another section.

7. Means according to claim 2, the transducers in a plurality of sections are series-connected to each other.

8. Means according to claim 7, the transducers of four adjacent sections are series-connected to each other and form a group.

9. Means according to claim 2, a measuring device which for each section of the billy roll comprises means for forming the difference between the local strip tension in the section and the average value of the strip tension acting on the complete roll.

10. Means according to claim 9, said measuring device comprising an indicator with an indicator part for each section, the signal corresponding to said difference being fed to the respective indicator part.

11. Means according to claim 2, a measuring device for each group of sections of the billy roll comprising means for forming the difference between the local strip tension in the group and the average value of at least the main part of the strip tension acting on the complete billy roll.

12. Means according to claim 1, said transducers being situated in grooves in the surface of the billy roll, said grooves being parallel to the axis of the billy roll.

13. Means according to claim 1, said transducers being situated in separate recesses in the billy roll.

14. Means according to claim 1, said transducers each comprising a core magnetostrictive material and a winding arranged on the core so that the inductance of the transducer is changed when the core is subjected to mechanical forces.

15. Means according to claim 1, the transducers each comprising a core of magnetostrictive material which is provided with exciting and measuring windings.

16. Means according to claim 15, the exciting windings of the transducers being connected to a common exciting current supply.

17. Means according to claim 15, the measuring windings of the transducers arranged within one section being series-connected and connected to a slip ring cooperating with a brush for taking out the measuring signal.

18. Means according to claim 17, wherein each section contains transducers in two planes which form angles with each other, the measuring windings being connected to each other in such a way that output signals from all transducers in one plane are added to each other to a sum signal and that the sum signal from the transducers in one plane is counter-directed with respect to the sum signal from the transducers in an adjacent plane.

19. Means according to claim 1, the billy roll being enclosed by a cylindrical casing which lies against the transducers and which is so thin that the pressure force from the strip to a substantial extent is transmitted to the transducers.

References Cited

UNITED STATES PATENTS

| | | | |
|---|---|---|---|
| 2,674,127 | 4/1954 | Garrett et al. | 73—159 |
| 2,809,519 | 10/1957 | Kaestner | 73—159 |
| 3,413,846 | 12/1968 | Flinth | 73—141 |

FOREIGN PATENTS

| | | |
|---|---|---|
| 258,850 | 11/1963 | Australia. |
| 718,194 | 9/1965 | Canada. |

CHARLES A. RUEHL, Primary Examiner

U.S. Cl. X.R.

73—159